United States Patent Office 3,245,971
Patented Apr. 12, 1966

3,245,971
AQUEOUS POLYMERIZATION PROCESS FOR VINYLIDENE FLUORIDE
Hyman Iserson, Erdenheim, Pa., assignor to Pennsalt Chemicals Corporation, Philadelphia, Pa., a corporation of Pennsylvania
No Drawing. Filed Jan. 24, 1962, Ser. No. 168,549
1 Claim. (Cl. 260—92.1)

This invention relates to the polymerization of vinylidene fluoride to high molecular weight homopolymers.

A number of systems are known for the homopolymerization of vinylidene fluoride. In U.S. Patent 2,435,537 to Ford and Hanford, for example, polymerization in aqueous media in the presence of both inorganic and organic catalysts is described.

While a wide variety of both inorganic and organic peroxy compounds are capable of catalyzing the homopolymerization of vinylidene fluoride, it has been found that both the properties of the polymer and the polymerization conditions are extremely sensitive to the particular catalyst system used. Inorganic peroxy compounds such as potassium persulfate, particularly in combination with reducing agents, such as sodium bisulfite, are capable of producing polymer under practicable conditions and at good rates, but the quality of the polymer, particularly with respect to thermal stability, is relatively poor in contrast to the polymers that may be produced using an organic peroxy catalyst. Organic peroxy catalysts, on the other hand, with only one known exception, require very high pressures to produce good quality polymer at practicable rates. The single known exception is di-tertiarybutyl peroxide, which has been found capable of producing high molecular weight polymer of excellent thermal stability at moderate pressures, e.g., 300–800 p.s.i. The preparation of homopolymers of vinylidene fluoride using a di-tertiary-butyl peroxide catalyst is described in copending application Serial No. 32,591, filed May 31, 1960, now Pat. No. 3,193,539, of Murray Hauptchein. As set out in more detail in that application, di-tertiary-butyl peroxide was the only organic catalyst of a large number tested, including, e.g., benzoyl peroxide, tertiary-butyl peracetate, disuccinic acid peroxide, methyl ethyl ketone peroxide, etc., that was capable of catalyzing the homopolymerization of vinylidene fluoride at moderate pressures to good quality, high molecular weight polymer.

In accordance with the present invention, another organic catalyst system has been found capable of promoting the formation of high molecular weight, thermally stable vinylidene fluoride homopolymers at moderate polymerization pressures. In the polymerization system of the invention, the combination of four essential ingredients is required, namely, (a) the use of an aqueous polymerization medium, (b) the use of a water soluble peroxide of a dibasic acid as the polymerization catalyst, (c) a small amount of a fluorinated surfactant, and (d) a small amount of iron powder. As will be illustrated in the detailed description which follows, it is essential that all four ingredients be present in the combination. An aqueous system employing the dibasic acid peroxide catalyst with the omission of either one or both of the fluorinated surfactant or iron powder is essentially inoperative for the production of vinylidene fluoride homopolymer at moderate pressures. Moreover, other organic catalysts known to be active polymerization promoters for fluorinated olefins such as tertiary-butyl peracetate and azobisisobutyronitrile have been found to be ineffective when substituted for the dibasic acid peroxide in the polymerization system of the invention.

An important feature of the present invention is that it provides the first practicable polymerization system for homopolymerizing vinylidene fluoride in the presence of a water soluble organic catalyst. Ditertiarybutyl peroxide, the only practicable organic catalyst presently known for the homopolymerization of vinylidene fluoride is essentially water insoluble, and although, in an aqueous system, the polymerization appears to occur predominately in the aqueous phase, these is some tendency for vapor phase polymerization. The vapor phase polymer that forms as a by-product in the aqueous system is undesirable because of its difficult-to-handle physical form (lumps rather than a fine dispersion) and because it is generally of lower molecular weight and poorer quality. With the use of a water soluble dibasic acid peroxide catalyst, on the other hand, the catalyst is essentially present only in the aqueous phase, and accordingly the problem of vapor phase polymerization is essentially eliminated.

The water employed as the polymerization medium is preferably de-oxygenated and de-ionized. The amount of water employed may vary over a relatively wide range. Generally, the weight ratio of vinylidene fluoride to water may range from 0.5:1 to 1:40 and preferably from 1:1 to 1:10.

The water-soluble dibasic acid peroxides useful in the invention include peroxides of saturated aliphatic dibasic acids having four to five carbon atoms, and thus include, disuccinic acid peroxide

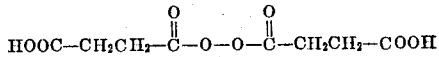

monosuccinic acid peroxide

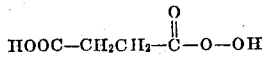

diglutaric acid peroxide

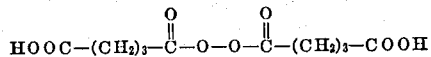

and monoglutaric acid peroxide

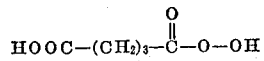

Particularly preferred is disuccinic acid peroxide. The catalyst is used in concentrations of from about 0.01% to 5%, and preferably from 0.05 to 2% by weight based on the total weight of monomer employed in a given run.

The fluorinated surfactant may in general be any surfactant having a hydrophobic portion which is at least half fluorinated and contains from about 5 to 15 carbon atoms; and an ionic hydrophilic (i.e. water solubilizing) portion which may, for example, be a carboxyl group, a metal or ammonium carboxylate group, or a sulfate, phosphate, amine, sulfonic acid, or water soluble sulfonic acid salt group. These surfactants should be soluble in water at least to the extent of about 0.05% by weight at polymerization temperature. A preferred class of fluorinated surfactants are those of the general formula X[R]—Y where X may be hydrogen, fluorine or chlorine; where R is a perfluoroalkylene or perfluorochloroalkylene radical having from 5 to 15 and preferably from 7 to 12 carbon atoms; and where Y is an ionic hydrophilic group. Perfluoroalkylene means an alkylene group containing only carbon and fluorine. Perfluorochloroalkylene means an alkylene group containing only carbon, fluorine and chlorine in which the atomic ratio of fluorine to chlorine is at least 1:1. Particularly preferred are perfluorinated surfactants such as the perfluorocarboxylic acids or their water soluble salts, such as perfluorooctanoic acid, perfluorononanoic, or perfluorodecanoic acid, and the alkali metal and ammonium salts thereof. Another particularly preferred class of fluorinated surfactant are the omega chloro perfluorocarboxylic acids, particularly those of the formula

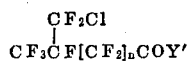

where $n$ is an integer ranging from about 7 to 13, and where B' is OH, alkali metal, or ammonium. Also suitable, for example, are the omega hydro perfluorocarboxylic acids such as $H(CF_2)_8COOH$ or water soluble salts thereof; perfluorochlorocarboxylic acids and their water soluble salts such as $Cl[CF_2CFCl]_3CF_2COOH$;

$$CF_2ClCCl_2[CF_2CFCl]_2CF_2COOH$$
$$CF_3CCl_2[CF_2CFCl]_2CF_2COOH$$

and their alkali metal or ammonium salts. The surfactant should be present in concentrations ranging from not less than about 0.05% to not more than about 5% by weight based on the weight of water used, and preferably from 0.1% to 2% by weight.

The powdered metallic iron is preferably very finely divided, e.g., all passing a 40 mesh sieve or finer. Preferred iron powders are those derived by reduction of a pure form of iron oxide preferably with hydrogen. They should be essentially free of oxidation products and essentially free from other impurities. The iron powder is used in small amounts ranging from as little as one part per million to about a hundred parts per million and preferably from 3 to 20 parts per million, by weight, based on the amount of water employed in the polymerization recipe.

Polymerization temperatures may be in the range of from about 50° C. to 110° C. and preferably from 65° C. to 95° C. Polymerization pressures should generally be at least about 200 lbs./in.² gage. There is no critical upper limit on the pressure that may be employed (e.g., pressures as high as 20,000 lbs./in.² and more may be employed if desired). However, little advantage is obtained in polymer quality or conversion by operating above about 2000 lbs./in.² gage, and in most cases, the optimum operating pressure from the standpoint of obtaining good reaction rates with the use of equipment of moderate cost will lie in the range of from about 300 pounds to 1200 pounds/in.² gage. The ability to operate at good reaction rates and to obtain high quality polymer at these moderate pressures is a highly advantageous feature of the invention.

In carrying out the polymerization, deoxygenated, deionized water is charged to the reactor together with the dibasic acid peroxide, the surfactant and iron powder, after which the air in the reactor is evacuated or swept out with an inert gas. The reactor is then charged with vinylidene fluoride under pressure. The reaction may be carried out either in a batch operation wherein a given charge of vinylidene fluoride is sealed in the reactor under pressure, heated at reaction temperature and the reactor then opened to recover the polymer; or the reaction may be carried out under constant pressure by connecting the reactor to a source of vinylidene fluoride under pressure such that the fresh vinylidene fluoride feed enters the reactor as conversion to the polymer occurs. Where the monomer is fed to the reactor continuously during the run, the full amounts of water, catalyst, surfactant and iron powder for the entire run may be loaded into the reactor at the beginning of the run, or alternatively, one or more of these materials may be injected continuously or semi-continuously into the reactor as the run proceeds. During the reaction, the reactor contents are preferably agitated such as by an internal agitator or by shaking or rocking the reactor as a whole. Following the procedures of the invention, the polymer is obtained in the form of a dispersion or latex in which the particles are of colloidal dimensions, i.e., less than one micron in size. The colloidal dispersions thus obtained may be coagulated to form an easily handled free flowing powder.

The following examples illustrate the invention:

Examples 1 to 7

These examples demonstrate the necessity for using both the fluorinated surfactant and the iron powder. Seven runs are conducted under substantially identical conditions. In two runs both the iron powder and the fluorinated surfactant are employed (Examples 1 and 2); in another two runs both of these ingredients are omitted (Examples 3 and 4); in another two runs the iron powder is omitted (Examples 5 and 6); and in the final run the fluorinated surfactant is omitted (Example 7).

In each of these examples a 300 milliliter stainless steel autoclave is charged with 100 milliliters of deionized and deoxygenated water and 0.4 gram of disuccinic acid peroxide. The autoclave is evacuated, cooled in liquid nitrogen and then charged with 35 grams of vinylidene fluoride $(CF_2=CH_2)$ by gaseous transfer in vacuo. In Examples 1 and 2 the autoclave is also charged with 0.5 gram of ammonium perfluorooctanoate, $C_7F_{15}COONH_4$ and 0.0007 gram of metallic iron powder prepared by the reduction of a pure iron oxide, equivalent to 7 parts of iron powder per million parts by weight of water. In Examples 3 and 4 both the fluorinated surfactant and the iron powder is omitted. In Examples 5 and 6 only the surfactant is employed, while in Example 7 only the iron powder is used.

After loading, the autoclave in each case is then sealed and placed in an electrical heating jacket mounted on a horizontal shaking apparatus and held at a temperature of about 80° C. for a period of 17 to 21 hours. A maximum pressure of about 750 lbs./in.² gage is reached and the pressure then decreases as the polymerization proceeds.

After the reaction, the autoclave is cooled, vented and opened. Where polymer was obtained, it is obtained in the form of a colloidal dispersion which is frozen and then thawed to precipitate the polymer, which is then filtered by suction.

The polymer is washed with water and methanol and then dried in a vacuum oven at about 70° C. The polymer is obtained as a fine white free flowing powder.

The polymer obtained in each run is then tested to determine molecular weight and thermal stability. Since it has not been possible to obtain a true solution of the polymer, absolute molecular weight determinations are not possible. A reliable indication, however, of relative molecular weight is obtainable by measurement of the "plasticity number" of the polymer. The plasticity number is defined as the area in square millimeters of a plaque made by placing 0.5 gram of polymer powder piled in a cone between the platens of a Carver press heated at 225° C. The platens are brought together to compress the powder under slight pressure (less than 50 lbs./in.²) and the powder is preheated in this manner at 225° C. for 30 seconds. A pressure of 2500 pounds is then applied for 60 seconds at a platen temperature of 225° C. The greater the area of the plaque so produced, the higher the plasticity number and the lower the molecular weight of the polymer. The plasticity number thus furnishes an empirical index of relative molecular weight, the lower plasticity numbers indicating higher molecular weight. Vinylidene fluoride homopolymers having plasticity numbers over about 3500 have only limited practical utility and preferably the plasticity number should be 2500 or less.

To determine the thermal stability of the polymer samples of compression molded films of each polymer are placed in a forced draft oven for 4 hours at a temperature of 200° C. and the appearance of the film noted after this treatment. A rating of excellent indicates no change in clarity or color. A rating of fair indicates yellowing of the film.

Results of the seven examples are tabulated in Table I. Note that in Examples 1 and 2 where both the fluorinated surfactant and the iron powder is employed, a good conversion to high molecular weight polymer (indicated by low plasticity number) was obtained which displayed excellent heat stability. In Examples 3 and 4 where both the fluorinated surfactant and the iron powder is omitted, and in Example 5 where the iron is omitted, no polymer of any kind is obtained. In Example 6 where the iron powder is omitted and in Example 7 where the fluorinated surfactant is omitted, only a very small conversion to polymer is obtained which displays only a fair thermal stability.

of polymer is obtained having a plasticity number greater than 5000 (indicating low molecular weight) and having poor thermal stability.

The above experiment is repeated with the addition of 7 parts per million of reduced iron powder per million parts of water and 0.5 gram of ammonium perfluorooctanoate. Again a low conversion to polymer is obtained (4.7 grams) having a plasticity number much greater than 5000 which forms a brittle plaque when compression molded, and having poor thermal stability. Thus, no improvement in conversion or polymer product

| Example | $CH_2=CF_2$, grams | $H_2O$, ml. | DSAP [a] catalyst, grams | $C_7F_{15}COONH_4$, grams | Fe powder, ppm.[b] | Temp., °C. | Time, hours | Polymer Product | | |
|---|---|---|---|---|---|---|---|---|---|---|
| | | | | | | | | Weight, grams | Plasticity number | Heat stability, 4 hrs. at 200° C. |
| 1 | 35 | 100 | 0.4 | 0.5 | 7 | 82 | 18.5 | 22.3 | 1,257 | Excellent. |
| 2 | 35 | 100 | 0.4 | 0.5 | 7 | 82 | 18 | 19.8 | 1,257 | Excellent. |
| 3 | 34.3 | 100 | 0.4 | | | 80 | 17 | 0 | | |
| 4 | 35 | 100 | 0.4 | | | 81 | 17 | 0 | | |
| 5 | 35 | 100 | 0.4 | 0.5 | | 80 | 21.5 | 0 | | |
| 6 | 35 | 100 | 0.4 | 0.5 | | 80 | 17.5 | 1.2 | 1,700 | Fair. |
| 7 | 35 | 100 | 0.4 | | 7 | 80 | 17.5 | 0.4 | 2,100 | Fair. |

[a] Dissuccinic acid peroxide.
[b] Parts per million parts by weight of $H_2O$.

Example 8

This example illustrates the catalyst system of the invention using a constant pressure polymerization technique. Disuccinic acid peroxide (0.4 gram) is dissolved in 100 milliliters of water and the solution is then poured into a 300 milliliter stainless steel autoclave. There is then added 0.0005 gram of reduced iron powder (5 parts of iron powder per million parts of water) and 0.5 gram of ammonium perfluorooctanoate. The autoclave is then closed, cooled in ice water and evacuated. It is placed in a heating jacket, set on a mechanical shaking apparatus, and connected to a cylinder of vinylidene fluoride by means of high pressure stainless steel tubing. The autoclave is pressured to 300 lbs./in.² gage with vinylidene fluoride and heated to 80° C. with shaking. The reducing valve on the vinylidene fluoride cylinder is adjusted to deliver a pressure of 660 lbs./in.² gage and the reactor is held at this pressure for 4 hours at 80° C. It is then cooled to room temperature vented and opened. Polymer is obtained in the form of a colloidal dispersion which is frozen and thawed to precipitate the polymer which is then filtered by suction. The polymer is washed with eight 300 milliliter portions of water and once with methanol and dried in a vacuum oven at 70° C. The vinylidene fluoride homopolymer is obtained in the form of a white free flowing powder having a plasticity number of 1591 indicating high molecular weight and having excellent thermal stability.

Example 9

This example and Example 10 which follows illustrate the ineffectiveness of the fluorinated surfactant-iron powder combination for producing vinylidene fluoride homopolymers when used with other organic catalysts known to be effective for the polymerization of halogenated ethylenes such as tetrafluoroethylene and chlorotrifluoroethylene.

A 300 milliliter stainless steel autoclave is charged with 100 milliliters of distilled, deoxygenated water, 1 milliliter of tertiary-butylperacetate (75% peroxide assay in benzene). The autoclave is cooled in a liquid nitrogen bath, evacuated and charged with 35 grams of vinylidene fluoride by vacuum transfer. It is then heated with shaking at 120 to 123° C. for 18 hours, cooled, vented and opened. The polymer is filtered off, washed with water, and dried. A low conversion of only 5.9 grams quality is obtained over the use of the tertiary butyl peracetate alone.

Example 10

A 300 milliliter stainless steel autoclave is charged with 100 milliliters of deoxygenated deionized water, 0.5 gram azobisisobutyronitrile and then charged with 35 grams of vinylidene fluoride by gaseous transfer in vacuo. The autoclave is then sealed and heated for 17½ hours with shaking at 78-82° C. Virtually no conversion to polymer (less than 0.3 gram) is obtained.

The above experiment is repeated under the same conditions with the addition of 0.5 gram of ammonium perfluorooctanoate and 0.0005 grams of iron powder (5 parts of iron powder per million parts of water) to the polymerization recipe. Again there is virtually no conversion to polymer (less than 0.2 gram) showing that the addition of the fluorinated surfactant and iron powder produced no improvement in results.

The high molecular weight vinylidene fluoride homopolymers obtainable by the process of the invention are particularly suitable for fabrication into fibers and films such as by melt extrusion or by casting from pseudo-solutions in dimethylformamide, or similar solvents. These polymers may be also molded by various techniques such as by extrusion, injection molding, compression molding into various shapes such as gaskets, gears, valve bodies and valve parts, electrical connectors etc.

The polymers obtainable in accordance with the invention are characterized by high melting temperatures of the order of 168° C. They have high thermal stability and are strong and tough. They are resistant to attack by a wide variety of chemical reagents, being substantially insoluble in such solvents as acetic acid, ethanol, ethyl acetate, ethylene dichloride, heptane, carbon-tetrachloride, toluene, water, trichloroethylene, isooctane, trichloroacetic acid, formamide, methyl hexyl ketone, and motor oil at 50° C. They resist attack by such reagents as hydrochloric, sulfuric, and nitric acids at all concentrations, inorganic salt solutions, inorganic bases such as sodium hydroxide, ammonium hydroxide as well as alcohols, alkanes, organic acids, esters, aromatic hydrocarbons, chlorinated hydrocarbons etc.

I claim:

A process for the production of homopolymers of vinylidene fluoride which comprises polymerizing a monomer consisting essentially of vinylidene fluoride in an aqueous medium at a temperature of about 50° to 110° C. and at a super-atmospheric pressure within the range of about 200 p.s.i. to 1200 p.s.i. in the presence of a peroxide of a dibasic acid having from 4 to 5 carbon atoms, a water soluble ionizable fluorinated surfactant having the general formula X[R]—Y where X is selected from the class consisting of hydrogen, fluorine and chlorine, where R is selected from the class consisting of perfluoroalkylene and perfluorochloroalkylene radicals having from 5 to 15 carbon atoms and where Y is an ionic hydrophilic group, and in the presence of iron powder in an amount ranging from about 1 part to 100 parts per million parts of water.

References Cited by the Examiner
UNITED STATES PATENTS

| | | | |
|---|---|---|---|
| 2,559,752 | 7/1951 | Berry | 260—92.1 |
| 2,750,350 | 6/1956 | Kroll | 260—92.1 |
| 3,012,021 | 12/1961 | Hauptschein | 260—92.1 |
| 3,069,404 | 12/1962 | Darby et al. | 260—92.1 |

JOSEPH L. SCHOFER, *Primary Examiner.*
JOSEPH R. LIBERMAN, *Examiner.*